(12) United States Patent
Sarukkai

(10) Patent No.: US 8,412,698 B1
(45) Date of Patent: Apr. 2, 2013

(54) CUSTOMIZABLE FILTERS FOR PERSONALIZED SEARCH

(75) Inventor: Ramesh R. Sarukkai, Union City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 883 days.

(21) Appl. No.: 11/102,185

(22) Filed: Apr. 7, 2005

(51) Int. Cl.
G06F 7/00 (2006.01)
G06F 17/30 (2006.01)

(52) U.S. Cl. .......................... 707/713; 707/706

(58) Field of Classification Search ............... 707/4
See application file for complete search history.

(56) References Cited

U.S. PATENT DOCUMENTS

| | | | |
|---|---|---|---|
| 5,752,242 A * | 5/1998 | Havens | 707/3 |
| 5,940,821 A * | 8/1999 | Wical | 707/999.003 |
| 6,006,218 A * | 12/1999 | Breese et al. | 707/3 |
| 6,006,225 A * | 12/1999 | Bowman et al. | 707/5 |
| 6,012,053 A * | 1/2000 | Pant et al. | 707/3 |
| 6,038,560 A * | 3/2000 | Wical | 707/999.005 |
| 6,460,034 B1 * | 10/2002 | Wical | 707/999.005 |
| 6,493,700 B2 * | 12/2002 | Couch et al. | 707/2 |
| 6,714,934 B1 * | 3/2004 | Fordham | 707/708 |
| 6,745,195 B1 * | 6/2004 | Kornfein et al. | 707/999.102 |
| 6,847,972 B1 * | 1/2005 | Vernau et al. | 707/999.101 |
| 7,031,957 B2 * | 4/2006 | Harris | 707/608 |
| 7,149,983 B1 * | 12/2006 | Robertson et al. | 715/810 |
| 7,237,191 B1 * | 6/2007 | Sulistio et al. | 715/246 |
| 7,305,415 B2 * | 12/2007 | Vernau et al. | 707/999.103 |
| 7,321,889 B2 * | 1/2008 | Smadja et al. | 707/999.002 |
| 7,328,216 B2 * | 2/2008 | Hofmann et al. | 707/100 |
| 7,392,278 B2 * | 6/2008 | Chen et al. | 707/999.003 |
| 7,395,511 B1 * | 7/2008 | Robertson et al. | 715/810 |
| 7,447,688 B2 * | 11/2008 | Dietz et al. | 707/999.005 |
| 7,502,783 B2 * | 3/2009 | Palmon et al. | 707/999.003 |
| 7,542,969 B1 * | 6/2009 | Rappaport et al. | 707/999.004 |
| 7,644,371 B2 * | 1/2010 | Robertson et al. | 715/810 |
| 7,698,342 B1 * | 4/2010 | Evans et al. | 707/755 |

(Continued)

FOREIGN PATENT DOCUMENTS

| | | |
|---|---|---|
| EP | 1 050 830 A2 | 8/2000 |
| WO | 2005/098611 A | 10/2005 |
| WO | WO 2005/098611 A2 | 10/2005 |

OTHER PUBLICATIONS

Pitkow et al., "Personalized Search: A Contextual Computing Approach May Prove a Breakthrough in Personalized Search Efficiency," Sep. 2002, Communications of the ACM, vol. 45, No. 9, pp. 50-55.*

(Continued)

*Primary Examiner* — Uyen T. Le
(74) *Attorney, Agent, or Firm* — Hickman Palermo Truong Becker Bingham Wong LLP

(57) ABSTRACT

A computerized search filtering method includes receiving on a client system a query from a querier; receiving a selection for a filter record from the querier, the filter record including a set of filter elements; retrieving the filter record from a filter-record database; transferring the query and the filter record to a search filter; adding at least one of the filter elements to the query to generate an amended-query; performing a document-corpus search to identify a set of documents relevant to the amended-query; identifying a subset of the documents that include at least one of the filter elements; and displaying on a display of the client system a set of search results for the subset of the documents.

19 Claims, 10 Drawing Sheets

U.S. PATENT DOCUMENTS

| | | | |
|---|---|---|---|
| 7,765,225 B2* | 7/2010 | Robert | 707/765 |
| 2001/0049677 A1* | 12/2001 | Talib et al. | 707/3 |
| 2002/0078045 A1* | 6/2002 | Dutta | 707/7 |
| 2002/0099685 A1* | 7/2002 | Takano et al. | 707/1 |
| 2003/0172082 A1* | 9/2003 | Benoit et al. | 707/101 |
| 2004/0034537 A1* | 2/2004 | Gengarella et al. | 705/1 |
| 2004/0088286 A1* | 5/2004 | Hackleman et al. | 707/3 |
| 2004/0088577 A1* | 5/2004 | Render | 713/201 |
| 2005/0033770 A1* | 2/2005 | Oglesby et al. | 707/104.1 |
| 2005/0071328 A1 | 3/2005 | Lawrence | |
| 2005/0076003 A1* | 4/2005 | DuBose et al. | 707/1 |
| 2005/0080767 A1* | 4/2005 | Dietz et al. | 707/3 |
| 2005/0091211 A1* | 4/2005 | Vernau et al. | 707/6 |
| 2005/0108200 A1* | 5/2005 | Meik et al. | 707/3 |
| 2005/0131889 A1* | 6/2005 | Bennett et al. | 707/4 |
| 2005/0165753 A1* | 7/2005 | Chen et al. | 707/3 |
| 2005/0216434 A1* | 9/2005 | Haveliwala et al. | 707/1 |
| 2005/0216447 A1* | 9/2005 | Talib et al. | 707/3 |
| 2005/0278633 A1* | 12/2005 | Kemp | 715/713 |
| 2006/0031215 A1* | 2/2006 | Pong Robert | 707/4 |
| 2006/0059134 A1* | 3/2006 | Palmon et al. | 707/3 |
| 2006/0059135 A1* | 3/2006 | Palmon et al. | 707/3 |
| 2006/0059143 A1* | 3/2006 | Palmon et al. | 707/5 |
| 2006/0069699 A1* | 3/2006 | Smadja et al. | 707/104.1 |
| 2006/0143254 A1* | 6/2006 | Chen et al. | 707/205 |
| 2006/0149622 A1* | 7/2006 | Baluja et al. | 705/14 |
| 2006/0156224 A1* | 7/2006 | Sulistio et al. | 715/513 |
| 2007/0005576 A1* | 1/2007 | Cutrell et al. | 707/3 |
| 2008/0071835 A1* | 3/2008 | Smadja et al. | 707/104.1 |
| 2008/0147663 A1* | 6/2008 | Vernau et al. | 707/7 |
| 2008/0228532 A1* | 9/2008 | Gengarella et al. | 705/5 |
| 2008/0243838 A1* | 10/2008 | Scott et al. | 707/5 |
| 2008/0294635 A1* | 11/2008 | Dietz et al. | 707/5 |
| 2009/0031236 A1* | 1/2009 | Robertson et al. | 715/765 |
| 2009/0228447 A1* | 9/2009 | Creekbaum et al. | 707/3 |
| 2009/0228785 A1* | 9/2009 | Creekbaum et al. | 715/239 |
| 2009/0313053 A1* | 12/2009 | Gengarella et al. | 705/5 |
| 2010/0094917 A1* | 4/2010 | Vernau et al. | 707/821 |

OTHER PUBLICATIONS

Google "Advanced Google Search Operators", downloaded from www.google.com/help/operators.html, Feb. 2, 2004.*

Google "Advanced Search Made Easy", downloaded from www.google.com/help/refinesearch.html, Oct. 17, 2004.*

Glover, E.J. et al. "Improving Category Specific Web Search by Learning Query Modifications", Proceedings of the 2001 Symposium on Applications and the Internet (SAINT 2001), pp. 23-31.*

Northern Light ("Northern Light Power Search"), downloaded from www.northernlight.com/power.html, Aug. 13, 2002.*

Liu, F., C. Yu and W. Meng "Personalized Web Search by Mapping User Queries to Categories", Proceedings of the $11^{th}$ ACM International Conference on Information and Knowledge Management (CIKM'02), Nov. 4-7, 2002, pp. 558-565.*

Notification of Transmittal of the International Search Report and the Written Opinion of the International Searching Authority, or the Declaration received in corresponding PCT International application No. PCT/US2006/012880.

Glover, Eric et al., "Architecture of a Metasearch Engine that Supports User Information Needs" XP-000895328, pp. 210-216.

Yahoo Inc., "Yahoo Help—What is advanced search?" XP002394295 retrieved from the Internet: <URL:http://web.archive.org/web/20040409083707/http://help.yahoo.com/help/us/ysearch/tips/tips-03.html> retrived on Aug. 9, 2006, 3 pages.

Essential Magic, "Essential Magic—Advanced MTG Card Search" retrieved from the Internet: <http://web.archive.org/web/20070713010608/http://essentialmagic.com/cards/search.asp> retrieved on Oct. 3, 2007, 2 pages.

* cited by examiner

CUSTOMIZABLE FILTERS FOR PERSONALIZED SEARCH

BACKGROUND OF THE INVENTION

The present invention relates to searching a document corpus for documents, and more particularly relates to methods and apparatus for customized filtering of a document corpus search and a set of search result of the document corpus search.

In a typical search system, a user using a client system issues a search query to search a document corpus and receives a set of search results via the client system. The search query may be issued from the client system to a search engine that is configured to search the document corpus, or an index thereof, for content that is relevant to the search query. The search engine may send a summary of the identified content in the form of a set of search results to the client system. The search results might include titles, abstracts, and/or links for the identified pieces of content. The search query and search results may be routed between the client system and the search engine over one or more networks, and by one or more servers coupled to the network.

The network might be a local network, a global internetwork of networks, or a combination of networks. Common local networks in use today include local area networks (LANs), wide area networks (WANs), virtual LANs (VLANs) and the like. One common global internetwork of networks in use today is referred to as the Internet, wherein nodes of the network send the search query to other nodes that might respond with the search results relevant to the search query. One protocol usable for networks that include search systems is the Hypertext Transport Protocol (HTTP), wherein an HTTP client, such as a browser program operating on the client system, issues a query for search results referenced by a Uniform Resource Locator (URL), and an HTTP server responds to the query by sending search results specified by the URL. Of course, while this is a very common example, the issuance of a query and the sending of a set of search results relevant to the query is not so limited.

For example, networks other than the Internet might be used, such as a token ring, a WAP (wireless application protocol) network, an overlay network, a point-to-point network, proprietary networks, etc. Moreover, protocols other than HTTP might be used to request and transport search results, such as SMTP (Simple Mail Transfer Protocol), FTP (File Transfer Protocol), HTTPS (hypertext transfer protocol secure), etc. Further, content might be specified by other than URLs. Portions of the present invention are described with reference to the Internet, but it should be understood that references to the Internet can be substituted with references to variations of the basic concept of the Internet (e.g., intranets, virtual private networks, enclosed TCP/IP networks, etc.), as well as other forms of networks. It should also be understood that the present invention might operate entirely within one computer or one collection of computers, thus obviating the need for a network.

Requested search results that are relevant to a query could be in many forms. For example, some search results might include text, images, video, audio, animation, program code, data structures, etc. The search results may be formatted according to the Hypertext Markup Language (HTML), the Extensible Markup Language (XML), the Standard Generalized Markup Language (SGML) or other language in use at the time.

HTML is a common format used for pages and other content that are supplied from an HTTP server. HTML-formatted content might include links to other HTML content and a collection of content that references other content might be thought of as a document web, hence the name "World Wide Web" or "WWW" given to one example of a collection of HTML-formatted content. As that is a well-known construct, it is used in many examples herein, but it should be understood that unless otherwise specified, the concepts described by these examples are not limited to the WWW, HTML, HTTP, the Internet, etc.

As described briefly above, a set of search results may include abstracts that identify documents that are relevant to a search query. The search results, however, may include a number of results that are not what the user had in mind when formulating a query (e.g., when formulating a query string). To locate the results the user had in mind, the user may review a number of the results, for example, by scrolling through the search results, which may be displayed as a Web page on the client system. If the search results are relatively lengthy, as is common, the user may become frustrated in attempting to locate the results that the user had in mind and might end their review of the search results. Alternatively, the user might issue another search query via their client system in an attempt to locate the search results the user had in mind.

The foregoing described process of issuing a search query and scrolling through search results may be repeated a number of times before a user is presented with a search result the user desires. The repetitive nature formulating and reformulating a query, and of scrolling through numerous sets of search results is essentially a manual filtering process performed by a user, and this process repeated a number of times can be both frustrating and time consuming for the user.

What is needed are an improved search apparatus and an improved search method for generating search results, wherein the search results are automatically filtered to provide the user with search results that are not only relevant to a query, but are also relevant to the user.

BRIEF SUMMARY OF THE INVENTION

A computerized search filtering method is provided for amending a query to perform a context-specific query of a document corpus, and for filtering a set of search results of the document corpus to generate context-specific search results such that the context of the amended query and the search results are set by the search filter, wherein a search filtering method according to one embodiment includes receiving on a client system a query from a querier, and receiving a selection for a filter record from the querier. The filter record includes a set of filter elements used for search filtering by a search filter. The method includes retrieving the filter record from a filter-record database based on the selection; and transferring the query and the filter record to the search filter. The method further includes the search filter adding at least one of the filter elements in the filter record to the query to generate an amended-query, and includes a search engine performing a document-corpus search to identify a set of documents relevant to the amended-query. The search filter then identifies a subset of the documents that include at least one of the filter elements. The subset of documents is then displayed on a display of the client system.

According to a specific embodiment, the querier is a human. According to another specific embodiment, the querier is a computer.

The filter elements include at least one keyword, at least one topic, and/or at least one domain name. The at least one keyword might include a negative keyword; the at least one topic might include a negative topic; and the at least one domain name might include a negative-domain name.

According to another embodiment a search system is provided and includes a client system configured to receive a query from a querier and receive a selection for a filter record that includes a set of filter elements. The system may include a filter-record database configured to receive a name for the filter record from the client system and retrieve the filter record based on the received name. The system may also include search filter configured to receive the query from the client system and receive the filter record from the filter-record database. The search filter is configured to amend the query to include at least one of the filter elements to form an amended query. The system may further include a search engine is configured to receive the amended query from the search filter and perform a corpus search to identify documents relevant to the amended query. The search engine is further configured to receive a set of search results for the amended query from the search engine, and identify a subset of documents that include at least one of the filter elements. The subset of the identified documents is identified in an amended set of search results. And the client system is configured to receive the amended set of search results for display.

Other features and advantages of the invention will be apparent in view of the following detailed description and accompanying figures.

DESCRIPTION OF SELECT EMBODIMENTS

Embodiments of the invention will now be described, by way of example, not limitation. It is to be understood that the invention is of broad utility and may be used in many different contexts.

Figure 1:
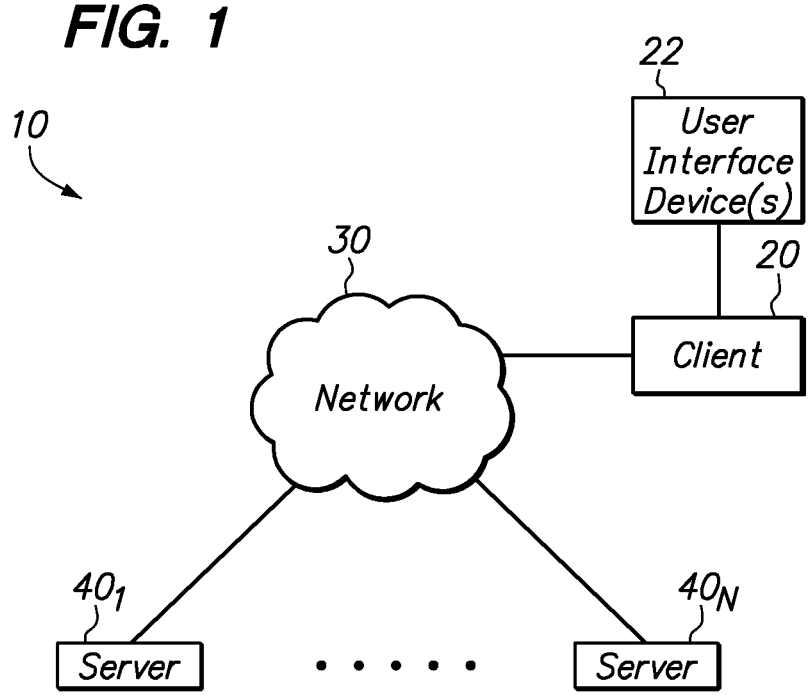
FIG. 1 is an illustration of an information retrieval and communication network that includes a client system according to an embodiment of the present invention.

FIG. 1 is an illustration of an information retrieval and communication network 10 including a client system 20 according to an embodiment of the present invention. In communication network 10, client system 20 is coupled through a network 30, such as the Internet and/or an intranet (e.g., a LAN or a WAN), to any number of server systems $40_1$ to $40_N$. As will be described herein, client system 20 is configured to communicate with any of server systems $40_1$ to $40_N$, for example, to request, access, receive, retrieve, and/or display a set of search results. As referred to herein a set includes one or more elements.

Several elements in the system shown in FIG. 1 include conventional, well-known elements that need not be explained in detail here. For example, client system 20 might include a desktop personal computer, workstation, laptop, PDA (personal digital assitant), cell phone, any wireless application protocol (WAP) enabled device or any other computing device capable of interfacing directly or indirectly to the Internet. Client system 20 typically runs a browser program, such as Microsoft's Internet Explorer™ browser, Netscape Navigator™ browser, Mozilla™ browser, Opera™ browser, a WAP-enabled browser in the case of a cell phone, a PDA or other wireless device, allowing a user of client system 20 to access, process and view search results available to it from server systems $40_1$ to $40_N$ over network 30. Client system 20 might also include one or more user interface devices 22, such as a keyboard, a mouse, a roller ball, a touch screen, a pen or the like, for interacting with a graphical user interface (GUI) provided by the browser on a display (e.g., monitor screen, LCD display, etc.), in conjunction with pages, forms, and other information provided by server systems $40_1$ to $40_N$.

The present invention is suitable for use with the Internet, which refers to a specific global internetwork of networks. However, it should be understood that other networks can be used instead of or in addition to the Internet, such as an intranet, an extranet, a virtual private network (VPN), a virtual LAN (VLAN), a non-TCP/IP based network, any LAN or WAN or the like.

According to one embodiment, client system 20 and system servers $40_1$-$40_N$ and their respective components are operator configurable using an application including computer code run using one or more central processing units, such as those manufactured by Intel, AMD or the like. Computer code for operating and configuring client system 20 to communicate, process, and display search results relevant to a query is preferably downloaded and stored on a hard disk, but the entire program code, or portions thereof, may also be stored on any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $40_1$ to $40_N$ to client system 20 over network 30 using a communication medium and protocols (e.g., TCP/IP, HTTP, HTTPS, Ethernet, or other conventional media and protocols). As referred to herein, a server system may include a single server computer or number of server computers configured to operate as a server system.

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 and/or servers $40_1$-$40_N$ or compiled to execute on client system 20 and/or servers $40_1$-$40_N$. In some embodiments, no code is downloaded to client system 20, and needed code is executed by a server, or code already present at client system 20 is executed.

Figure 2:
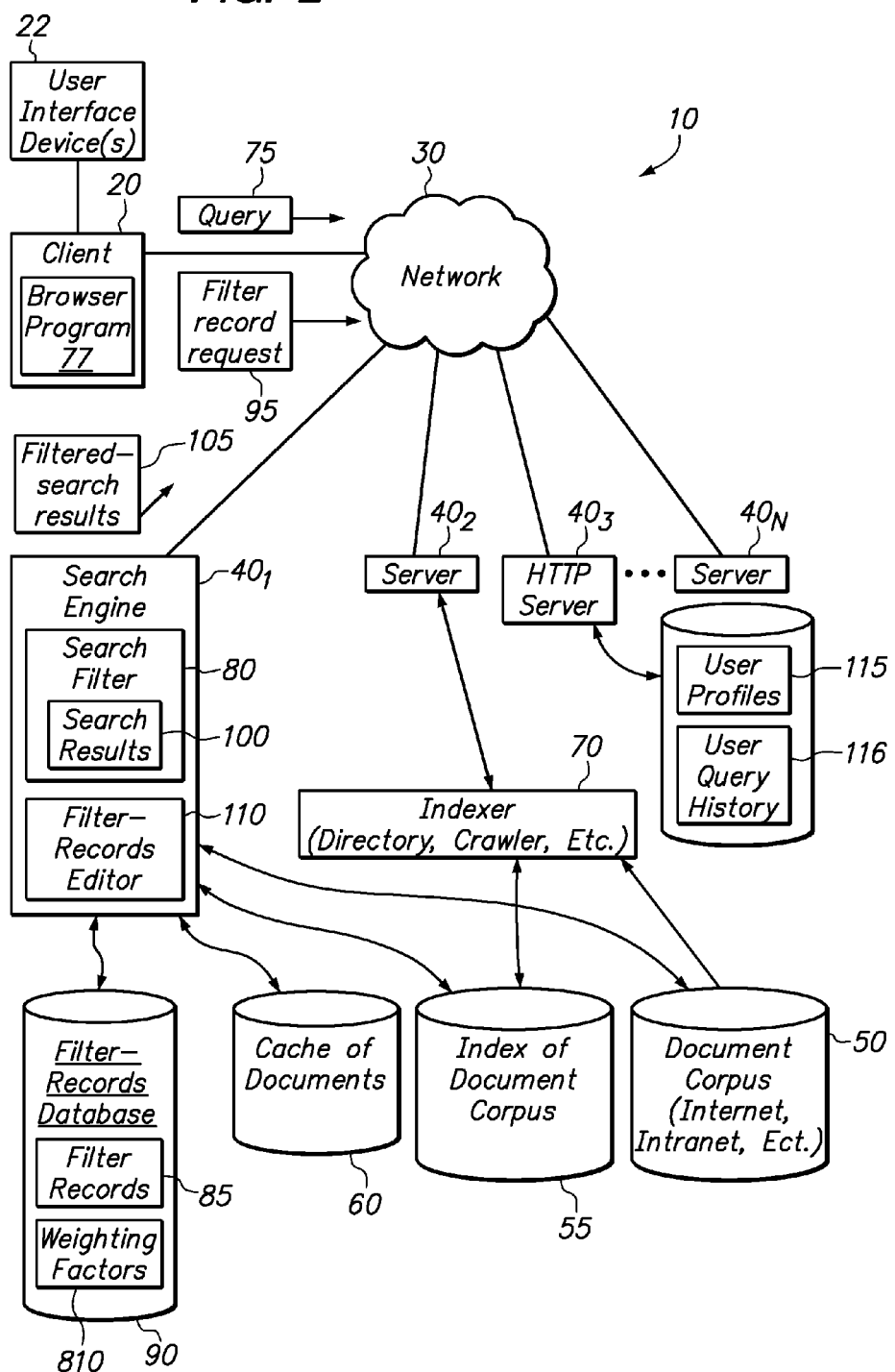
FIG. 2 is an illustration of the information retrieval and communication network shown in further detail according to one embodiment of the present invention.

FIG. 2 is an illustration of information retrieval and communication network 10 shown in further detail according to one embodiment of the present invention. According to the embodiment of network 10 shown in FIG. 2, server system $40_1$ is configured to operate as a search engine, and for convenience, will be referred to herein as a search engine. Although, server system $40_1$ is referred to as a search engine, this server system may be configured to perform a number of processing functions in addition to searching.

According to one embodiment, network 10 includes one or more of a document corpus 50, an index of the document corpus 55, and a document cache 60. The document corpus might include the Internet, an intranet, a combination thereof or the like. For example, documents on an intranet might include documents on a Yahoo! intranet and might include documents associated with (e.g., configured to be served by) one or more Yahoo! property servers, such as the Yahoo! news property server, the Yahoo! sports property server, the Yahoo! health property server, the Yahoo! auction property server or the like. The index of the document corpus includes an index of documents in the document corpus, and the document cache includes cached versions of documents in the document corpus. A document as referred to herein may include text, images, video, audio, animation, program code, data structures, formatted text, etc.

Document corpus index 55 and/or document cache 60 may be "populated" with index information and cached documents, respectively, by one or more servers, such as server $40_2$ that might be configured to operate in conjunction with an indexer module 70 to populate the index and cache. According to one embodiment, the search engine is configured to search one or more of the document corpus, the index, and the document cache to identify documents. The search engine may by configured to initiate a search at the request of client system 20 on receipt of query 75 issued by the client system.

A query for a search may be requested by a user via client system 20. The client system may be configured to communicate with the search engine over network 30, for example, via server $40_3$, which might be an HTTP server. Accordingly, one or more processes configured to operate on the client system might be HTTP clients that are configured to communicate with the HTTP server. According to one embodiment, client system 20 is configured to run a browser program 77 that may be an HTTP client.

Figure 3:
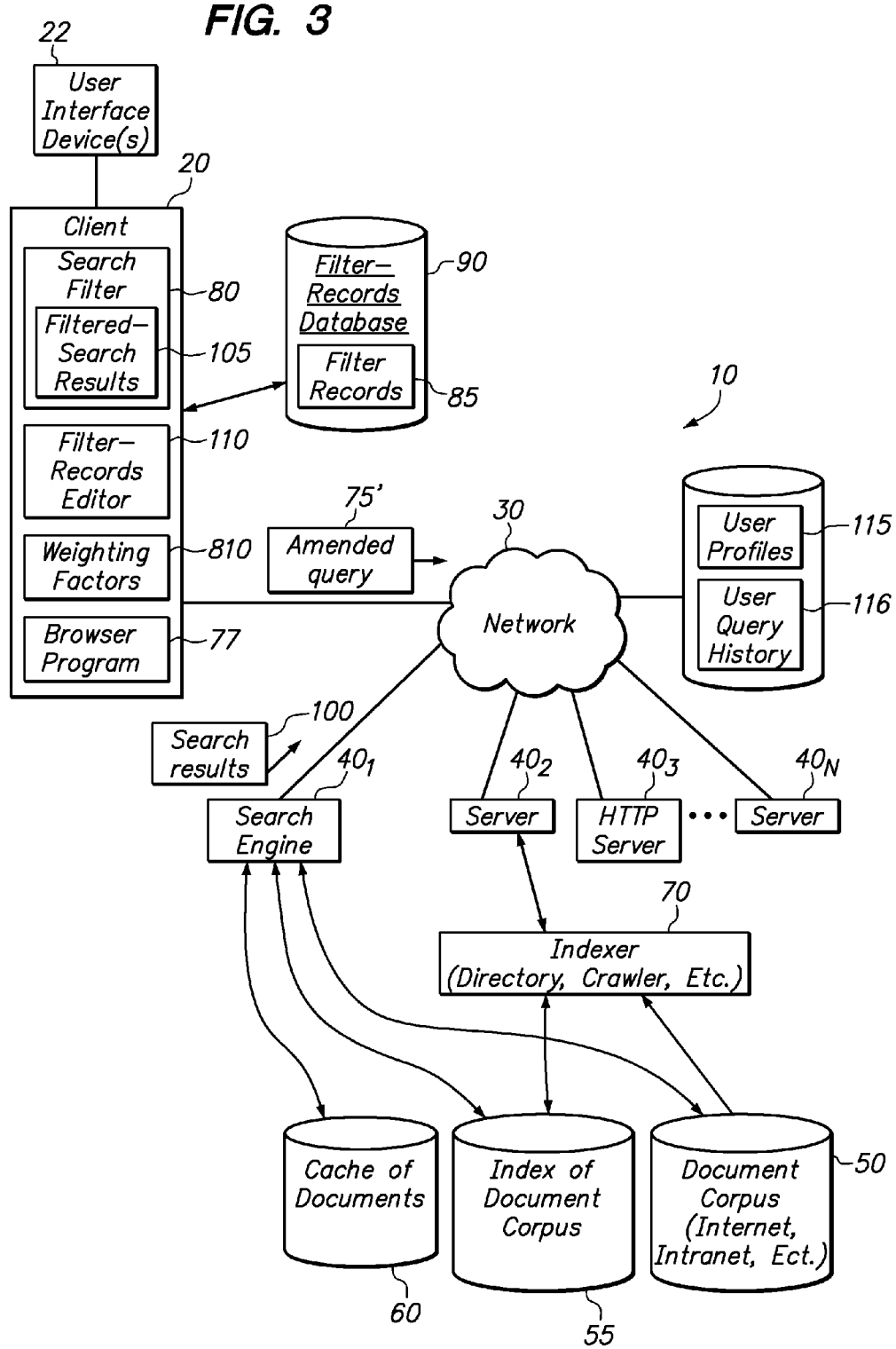
FIG. 3 is an illustration of the information retrieval and communication network shown in further detail according to another embodiment of the present invention.

According to one embodiment, network 10 includes a search filter 80. Search filter 80 is configured to filter search results generated by the search engine. Search filtering is described in detail below. According to one embodiment, search filter 80 is operative on one or more of the search engines, the HTTP server, and the client system. While the search filter is shown in FIG. 2 as being located on the search engine, the search filter might be located on the HTTP server or on the client system (see, for example, FIG. 3). If the search filter is configured to operate on more than one of the search engines, the HTTP server, and the client system, the search filter may be configured as a multi-module system, wherein modules of the search filter may be stored on the systems on which the modules are configured to operate. Alternatively, the modules of the search filter may be distributed to these systems at the time the search filter is used. For example, the HTTP server may be configured to distribute modules of the search filter to the systems on which the modules are operable.

Alternatively, the search filter may be ported from the HTTP server or the search engine to the client system for use thereon. The search filter might be ported to the client system at the request of the client system if, for example, a query is entered on the client system by the user. It should be understood that the foregoing described distributed and consolidated configurations of the search engine are described for exemplary purposes. While the search filter has been described as software, the search filter might be a hardware module (e.g., an application specific integrated circuit [ASIC]), a firmware module or a combination of the foregoing.

The search filter is configured to operate in conjunction with one or more filter records 85 that may be stored in a filter-records database 90. One or more of the search engine, the client system, and the HTTP server may be operatively coupled to filter-records database 90, and may be configured to retrieve filter records 85 from the filter-records database. Alternatively, the filter-records database may be resident on one or more of these systems. Filter records are described in further detail below.

Figure 4:
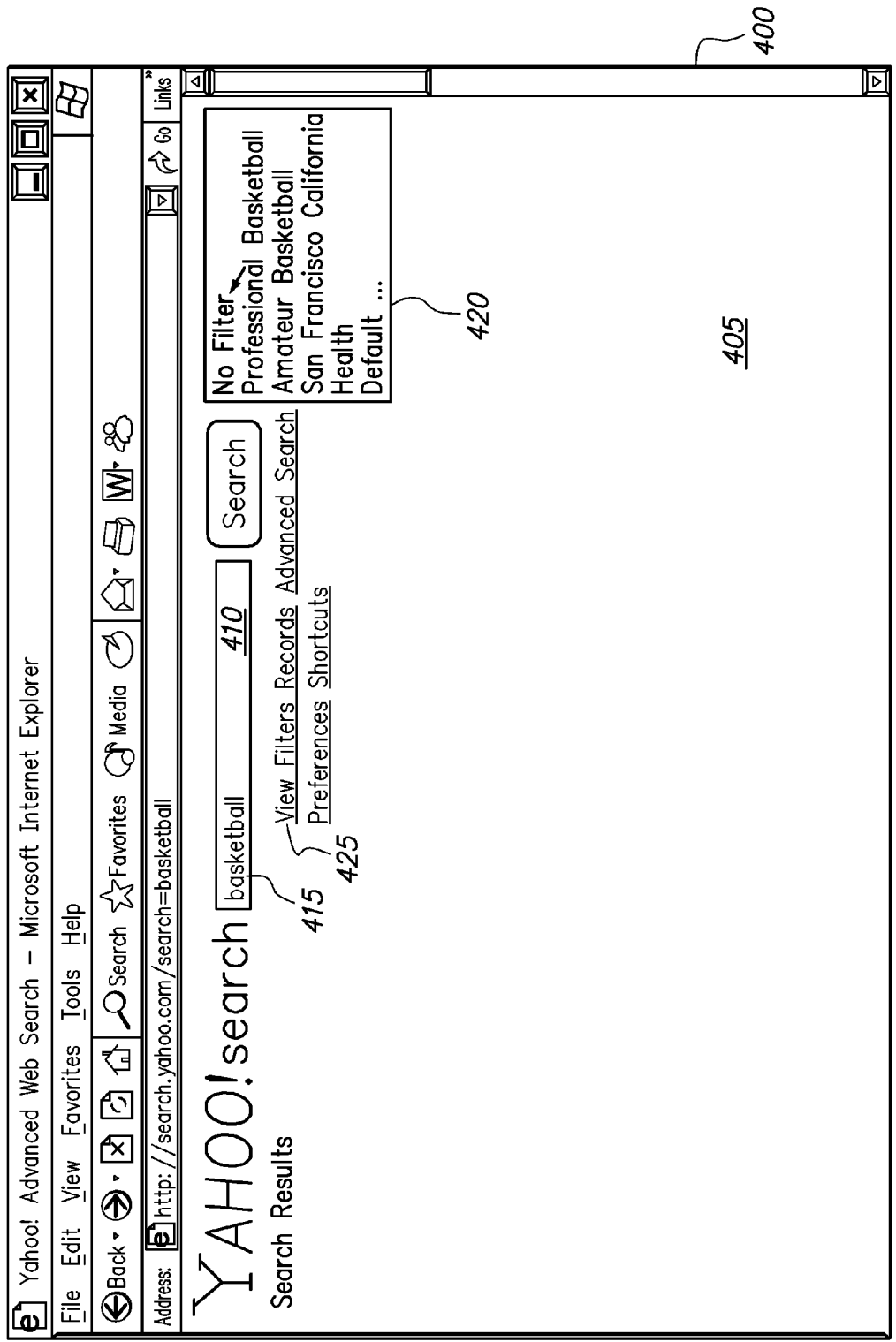
FIG. 4 is an illustration of a browser window that includes a search page configured to receive a query string according to one embodiment of the present invention.

FIG. 4 is an illustration of a browser window 400 that includes a search page 405 according to one embodiment of the present invention. Search page 405 is shown for exemplary purposes and may be alternatively configured as will be readily understood by those of skill in the art. Therefore, the exemplary embodiment should not be viewed as limiting the invention as specified by the claims. The search page might be a Yahoo! search page or other search page, and might be formatted as an HTML page, an XML page or the like. The search page might be served to the client system by the HTTP server, which might be a Yahoo! property server or the like.

The search page may include a field window 410 that is configured to receive query information 415 in the form of a query string (e.g., text), image data (e.g., graphical images, such as video or the like), audio data, a link that points to a page (such as a Web page on the Web) or the like. The query string might be entered in the field window by a user operating the client system. For example, a user might enter the query string "basketball" in field window 410 as shown in FIG. 4 or may enter any other query string the user desires information for.

According to one embodiment, search page 405 includes a menu 420 (e.g., a drop down menu) that is configured to provide a number of filter record options that may be selected by a user. Specifically, the menu also includes the names of filter records that a user may select and that are stored in filter-records database 90. The filter records included in menu 420, according to the example being considered, include a professional basketball filter, an amateur basketball filter, a San Francisco filter, a health filter, and a set of default filters. Menu 420 also includes an option to not apply the search filter (e.g., "no filter") to a corpus search. The names of the filter records shown in FIG. 4 are shown for exemplary purposes.

Figure 5:
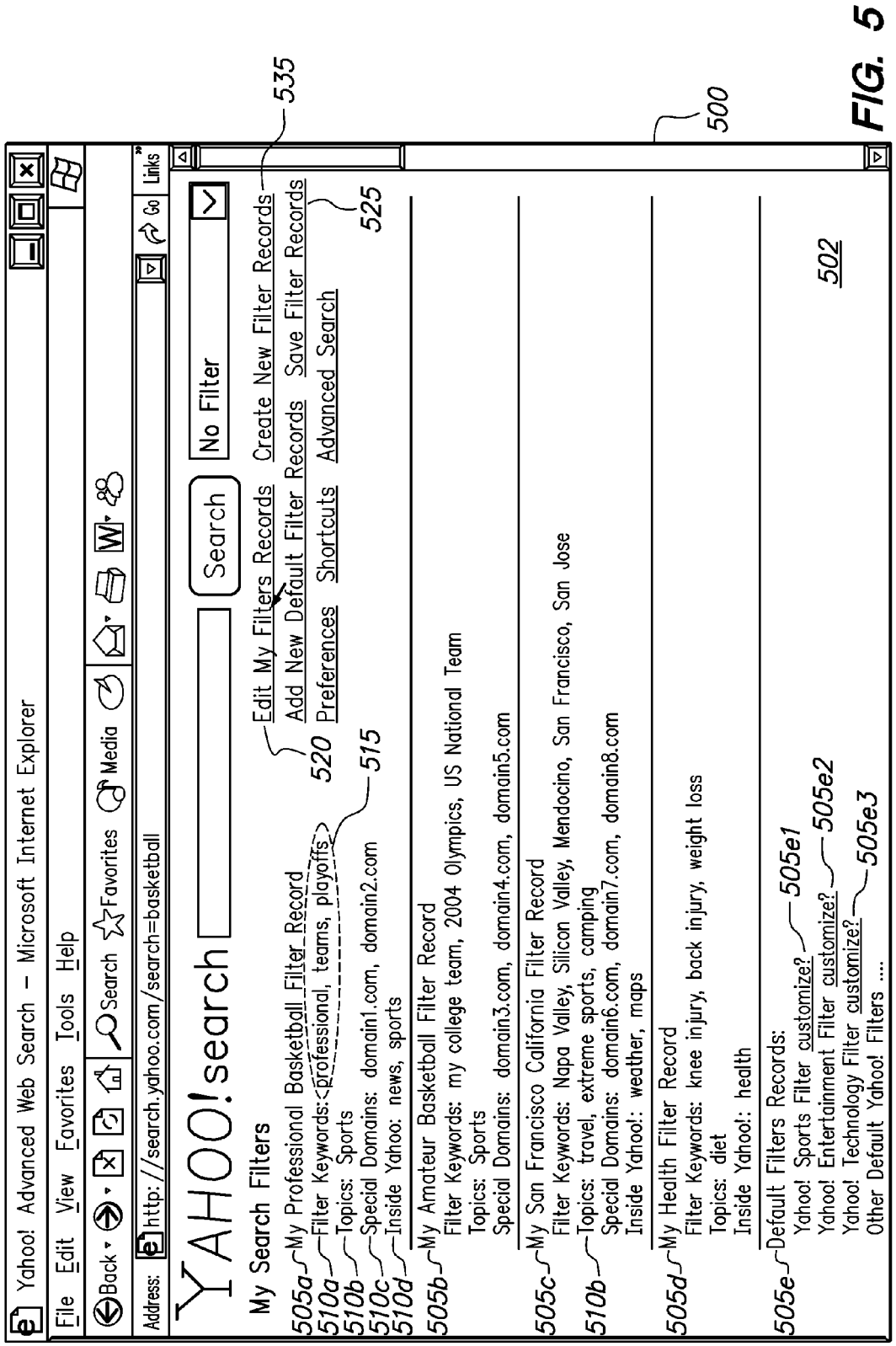
FIG. 5 is an illustration of a browser window that includes a Web page that in turn includes an exemplary set of filter records, wherein each filter record includes a number of filter fields and associated filter elements.

Search filter 80 is configured to use a filter record selected by a user for filtering search information, such as query 75 and/or search results 105. A number of properties of filter records are described first below prior to a description of the search filter's use of the filter records. FIG. 5 is an illustration of a browser window 500 that includes a Web page 502 that in turn includes an exemplary set of filter records 505. Each filter record 505 includes a set of filtering fields 510 that includes one or more filtering elements that may be used by the search filter for filtering. The exemplary filter records shown in FIG. 5 include a professional basketball filter record 505*a*, an amateur basketball filter record 505*b*, a San Francisco filter record 505*c*, a health filter record 505*d*, and a set of default filter records 505e. The exemplary default filter records include a Yahoo! sports filter 505e1, a Yahoo! entertainment filter 505e2, and a Yahoo! technology filter 505e3. It should be understood that these filter records are shown for illustrative purposes, and the set of filter records might include other filter records.

As briefly mentioned above, each filter record 505 includes a set of filter fields 510. The filter fields may include one or more of keywords, negative keywords, topics, negative topics, "special-domain names," "negative-special-domain names," inside Yahoo! domain names and the like. According to the example being considered, the filter fields include keywords 510a, topics 510b, special domains 510c, and inside Yahoo! links 510d. Each filter field 510 included in a filter record 505 is associated with a set of filter elements 515. For example, the topics filter field 510b, in the San Francisco filter record 500c, includes the filter elements: travel, extreme sports, and camping.

In general, keywords are specific stings (e.g., words or lists of words) that might by included in a document or in metadata associated with a document. Topics might define categorizations of documents. A given topic might be associated with a number of documents that are assigned to that given topic. For example, documents relating to basketball, baseball, soccer or the like might be assigned to a sports topic. Or documents relating to muscle strains, the common cold, knee injuries and the like may be assigned to a health topic. Documents might be assigned to more than one topic, if, for example, the documents include information for one or more aspects of an issue. For example, a document that provides information about muscle strains that are common to basketball players might be assigned to a sports topic and a health topic. Keywords, topics, domain names, and inside Yahoo! domain names are described in further detail below.

Search page 405 may include a View Filter Records option 425 (e.g., a screen button associated with a link or the like) that may be configured to initiate the display of the filter records. The View Filter Records option might be a screen button associated with a link that is configured to retrieve the filter records for display.

Filter records, such as filter records 500, might be organized in a variety of formats, such as a plain text, an HTML file, an XML file, a proprietary file or the like. The filters record may be edited via a filter-records editor 110 (see FIGS. 2 and 3), which might be activated by selecting an Edit My Filters Records option 520 on the filter records page. The filter-records editor might be a dedicated editor, a text editor, a word processor or the like. Alternatively, Web page 502 may be configured to permit a user to edit the filter records directly on the page, and save the edited filter records by selecting a Save Filter Records option 525. According to one embodiment, Web page 502 might include a screen option 535 for adding filter records to a user's set of filter records. Screen option 535 (e.g., a screen button associated with a link) might be configured to launch the filter editor or other editor configured for adding filter records to a set of filter records.

The filter editor may be configured to impose a select structure on filter records, such as the structure shown in FIG. 5. For example, a new filter record may include each filter field that might be included in a filter record. The filter elements might be placed in the filter fields by keying in (e.g., typing) the filter elements, selecting filter elements from menus, such as drop down menus, or the like. For example, each filter field might be associated with a drop down menu that might be selected by clicking on the filter field and then clicking on a filter element in the drop down menu. The filter editor might be configured to remove filter fields from a filter record for which no filter elements are entered.

According to an alternative embodiment, a filter record is created by the filter editor and populated with information included in a user profile 115. User profiles might be populated with user information by a user via their associated client system, populated by a server configured to monitor user behavior (Web pages viewed, ads clicked on, etc) or the like. The filter editor may be configured to collect information from a user profile at the time the user profile is created, edited, or at other times. The filter editor may be configured to extract keywords, topics, domain names, and the like, and place this information in the appropriate filter fields of an existing or new field record.

The filter records editor may populate one or more filter fields of one or more filter records with information extracted from a user query history 116. User query history 116 may be stored on the client system, in the filter records database, in the user profile database or the like. The user query history includes query information of one or more user queries issued by the user via his or her client system. The user query history may include the query string of each query issued by the user. The user query history may be retrieved by the filter record editor for analysis to determiner whether to populate a filter record with query information from the user query history. The query strings included in the user query history may be parsed by the filter records editor, or the like, to determine the frequency of specific query strings (e.g., keywords, topics, domain names, and the like) included in the query strings. If the number of times a specific query string is included in the user query history exceeds a given number (e.g., 10, 20, etc.), this specific query sting may be placed in one or more of the user's filter records or one or more of the default filter records provided for the user. According to one embodiment, the filer records editor may be configured to determine whether the specific query sting is associated with an existing search filter (e.g., the professional basketball filter record 505a, the amateur basketball filter record 505b or the like). If the filter records editor determines that the specific query string is associated with a one or more filter records (e.g., the professional basketball filter record), then the filter records editor may enter the specific query string into one or more of the filter fields of these filter records. The filter editor may further be configured to determine whether the specific query sting is a keyword, a topic, a domain name or the like, and insert the query string into the identified filter field. While the filter record editor is described as being configured to retrieve and analyze the user query history, other modules on the communication network (e.g., one or more of servers $40_1$-$40_n$, a dedicated program configured to operate on the client system, the server systems or the like) may be configured to retrieve and analyze the user query history to populate the filter records. The user query history may be accumulated by one or more of the search filter, the browser program, the filter records editor, one or more of servers $40_1$-$40_n$, a dedicated program configured to operate on the client system, or the like.

According to one embodiment, filter records are transferable. For example, a user via client system 20 may transfer their filter records to the client systems of other users. For example, filter records may be configured to be uploaded to a server, such that another user via their associated client system can download these filter records to their client system. Filter records might also be transferable by e-mail, disk transfer, peer-to-peer file transfer, or other well known methods for transferring files.

According to one embodiment, search filter 80 is configured to: i) amend a query to generate an amended query based on one or more filter elements included in a field record, and/or ii) filter a set of search results based on one or more of filter elements. For example, search filter 80 may be configured to add filter elements for keywords and/or topics to an original query string entered by a user to generate an amended query string used in an amended query 75'. For example, if the user enters the query string "basketball" in field window 405 and selects the amateur basketball filter record, then search filter 80 may generate an amended query string that includes: "basketball 'my college team' '2004 Olympics' 'US National Team' 'medal tally.'" According to the example, the strings added to query string basketball include the keywords in the amateur basketball filter record. Alternatively, if the user enters the query string "basketball" in field window 405, and selects the health filter record, then search filter 80 may generate an amended query that includes "basketball 'knee injury' 'back injury' 'weight loss,'" wherein the strings added to the query string basketball include the keywords of the health filter record.

If the search filter is operative on the client system, the search filter may generate the amended query on the client system. For example, the search filter may be configured to request the filter record selected by the user, and use this filter record to generate the amended query. The search filter may request the filter record substantially directly from the filter records database if the filter records database is operatively coupled to the client system. Alternatively, the search filter may request the filter record from the HTTP server or the search engine if the filter record database is operatively coupled to one of these servers. For example, the browser program, via client system 20, may send a filter record request 95 (e.g., an HTTP request) to the HTTP server or the search engine to retrieve a selected filter record. The filter record request might include the name of the filter record or other identifier for the selected filter record. The HTTP server or the search engine may be configured to retrieve the filter record identified in the filter record request, and send this filter record to the client system.

Alternatively, if the search filter is configured to operate on the search engine, the browser program may be configured to send query 75 and the name, or other identifier for the selected filter record, (e.g., in an HTTP request) to the search engine (e.g., via the HTTP server). The search filter may then retrieve the identified filter record, and generate an amended query on the search engine. If the search engine is operative on the HTTP server, the HTTP server may be configured to operate similarly.

The search engine is configured to use the amended query to search one or more of: the document corpus (e.g., in real time), the index of the document corpus, and document cache to identify documents relevant to the amended query. The search engine is thereafter configured to organize the documents identified in the search into a set of search results 100.

Subsequent to generating the set of search results, the search filter is configured to filter the search results to generate a set of filtered-search results 105. If the search filter is configured to operate on the client system or the HTTP server, the search engine may be configured to send search results 100 to the client system or the HTTP server for filtering and generation of the filtered-search results. Alternatively, if the search filter is configured to operate on the search engine, the filtered-search results may be generated on this server and sent to the client system for display and use by the user.

The search filter may be configured to filter the search results based on one or more filter elements of one or more filter fields of the filter record selected by the user. For example, if the selected filter record includes a set of negative keywords, the search filter may be configured to remove from the search result one or more identified documents that include the negative keywords. Or the search filter may rank the search results based on the negative keywords such that the identified documents that include the negative keywords are ranked relatively lower than other identified documents that do not include the negative keywords. Alternatively, if an identified document includes one of the keywords included in a selected filter record, the search filter may be configured to rank this identified document higher than other documents that do not include the keyword. According to one embodiment, the search filter may be configured to rank a select number of identified documents to form a set of filtered-search results. For example, the search filter may be configured to filter and re-rank the top 50, the top 100, etc. identified documents included in search results 100.

The search filter may be configured to remove or rank identified documents in the search results based on the special-domain names and/or the negative-special domain names. Removal and/or ranking of search results based on special-domain names and/or negative-special-domain names may be executed as described above with respect to keyword filtering and negative-keyword filtering. For example, if an identified document is associated with a special-domain name that is included in the selected filter record, this identified document might be ranked higher than identified documents that are not associated with this domain name. Further, the search filter may be configured to remove or rank identified documents in the search results based on the topics and/or negative topics. For example, if an identified document is assigned to a given topic, then this identified document may be ranked higher in a set of filtered-search results than other identified documents not associated with the given topic.

Figure 6:
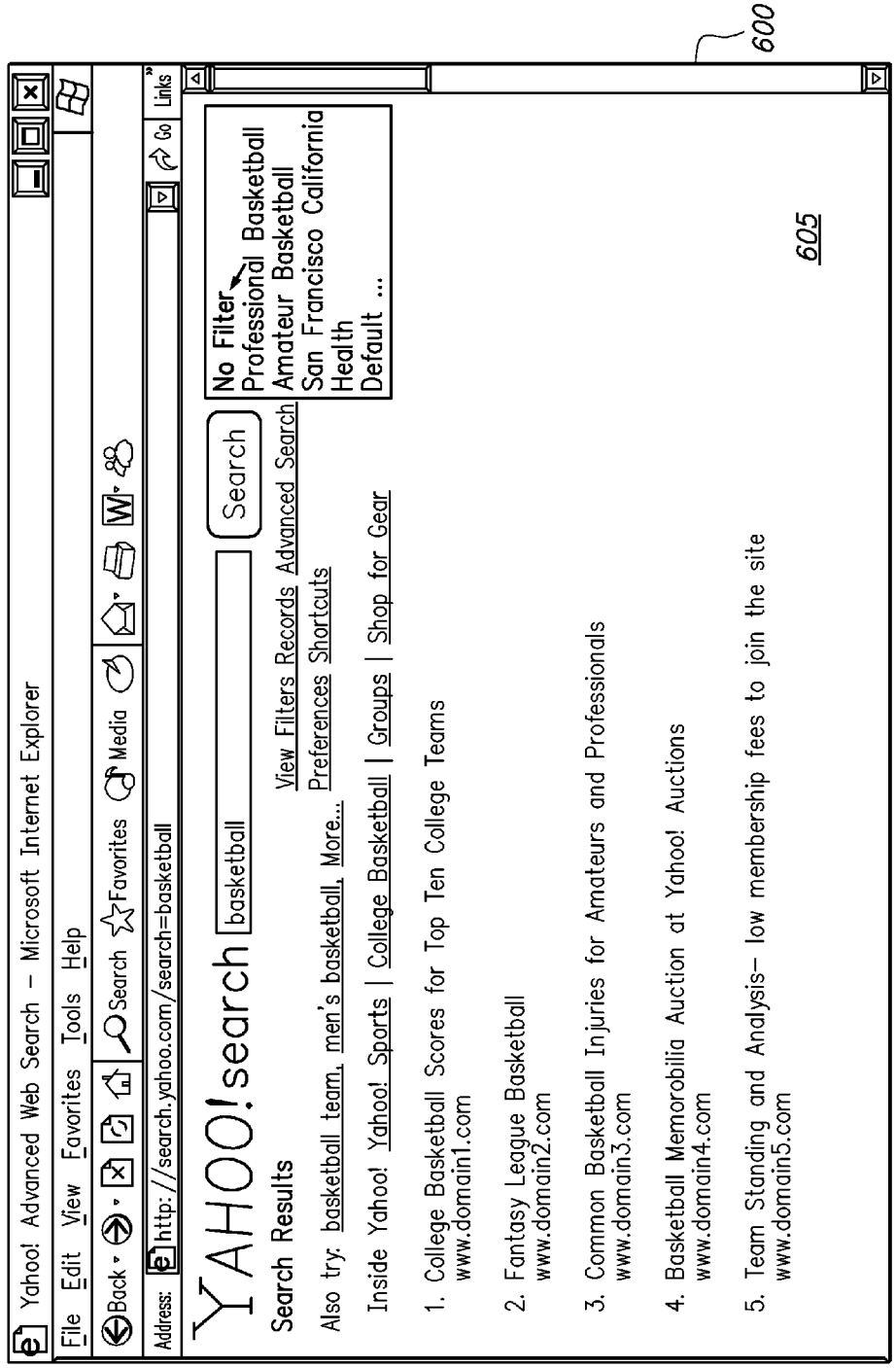
FIG. 6 is an illustration of a browser window that includes a Web page that in turn includes a set of search results that are not filtered by the search filter.
Figure 7:
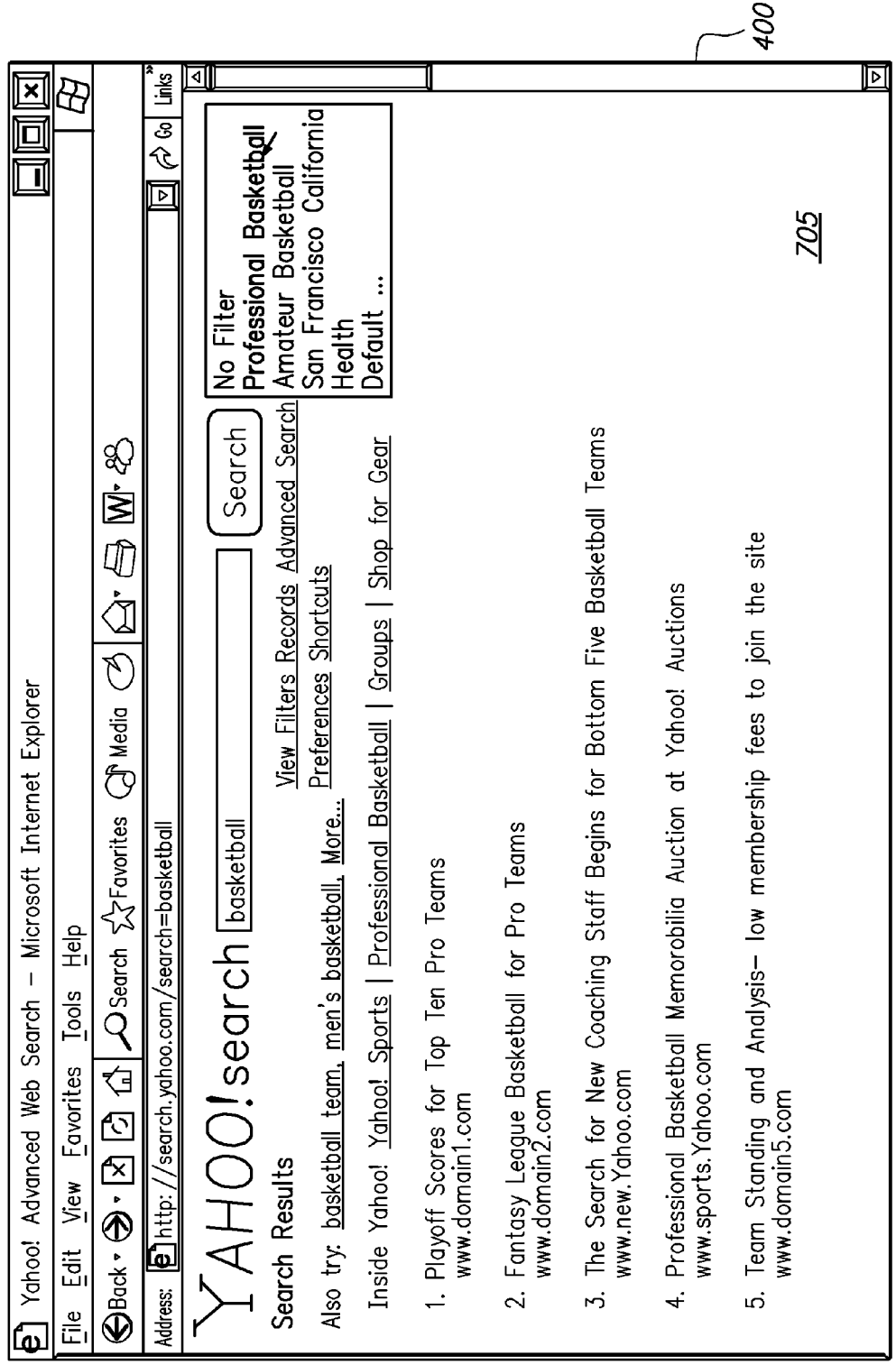
FIG. 7 is an illustration of a browser window that includes a Web page that includes a set of search results filtered by the search filter based on a selected filter record.

Filtered-search results 105 may be presented to the user via their associated client system. FIGS. 6 and 7 are illustrations of a browser window 400 that includes, respectively, a Web page 605 of a set of search results that are not filtered by the search filter, and a Web page 705 of a set of filtered-search results that are filtered by the search filter. The search results illustrated in FIG. 6 might be for the query string "basketball," wherein the user selected the "no filter" option from menu 410. The search results illustrated in FIG. 7 might be for the query string "basketball," wherein the user selected the "professional-basketball filter record" from menu 410. While the search results illustrated in FIG. 6 include abstracts for identified documents related to basketball, the search results might or might not include the particular information the user desires related to professional basketball, and/or these search results might or might not be arranged such that the user can quickly and easily identify the information relevant to professional basketball. Alternatively, the filtered-search results illustrated in FIG. 7 are filtered such that the abstracts that include the keyword elements: professional, teams, and the like included in the selected filter record are ranked as being relevant to the to the keyword elements. Other abstracts not including the keyword elements are ranked relatively lower than those abstracts that include these keyword elements. Select abstracts that are ranked relatively higher than other abstracts are positioned at or near the top of abstracts presented in the filtered-search results. Further, abstracts for identified documents that are on the special domains (e.g., domain1.com and domain2.com) and/or the inside Yahoo! domains (e.g., news.yahoo.com and sports.yahoo.con) are relatively highly ranked and are positioned at or near the top of abstracts presented in the filtered-search results. Further yet, abstracts for identified documents that are assigned to the topic sports are also ranked relatively highly and positioned at or near the top of abstracts presented in the filtered-search results. As such, the user may relatively quickly locate identified documents that relate to professional basketball and the particular filter element in the professional basketball filter record.

According to one embodiment, if documents identified by the search engine are in a document corpus associated with one or more Yahoo! property servers (which are listed in a search filter record, e.g., the Yahoo! news property server and the Yahoo! sports property server includes in the professional basketball filter record), then the search filter may be configured to place links (e.g., link 620 in FIGS. 6 and 7) to these servers on a Web page that includes a set of search results. The abstracts of identified documents associated with the Yahoo! property servers might also be ranked in the search as described above with respect to ranking of search results based on keywords.

Figure 8:
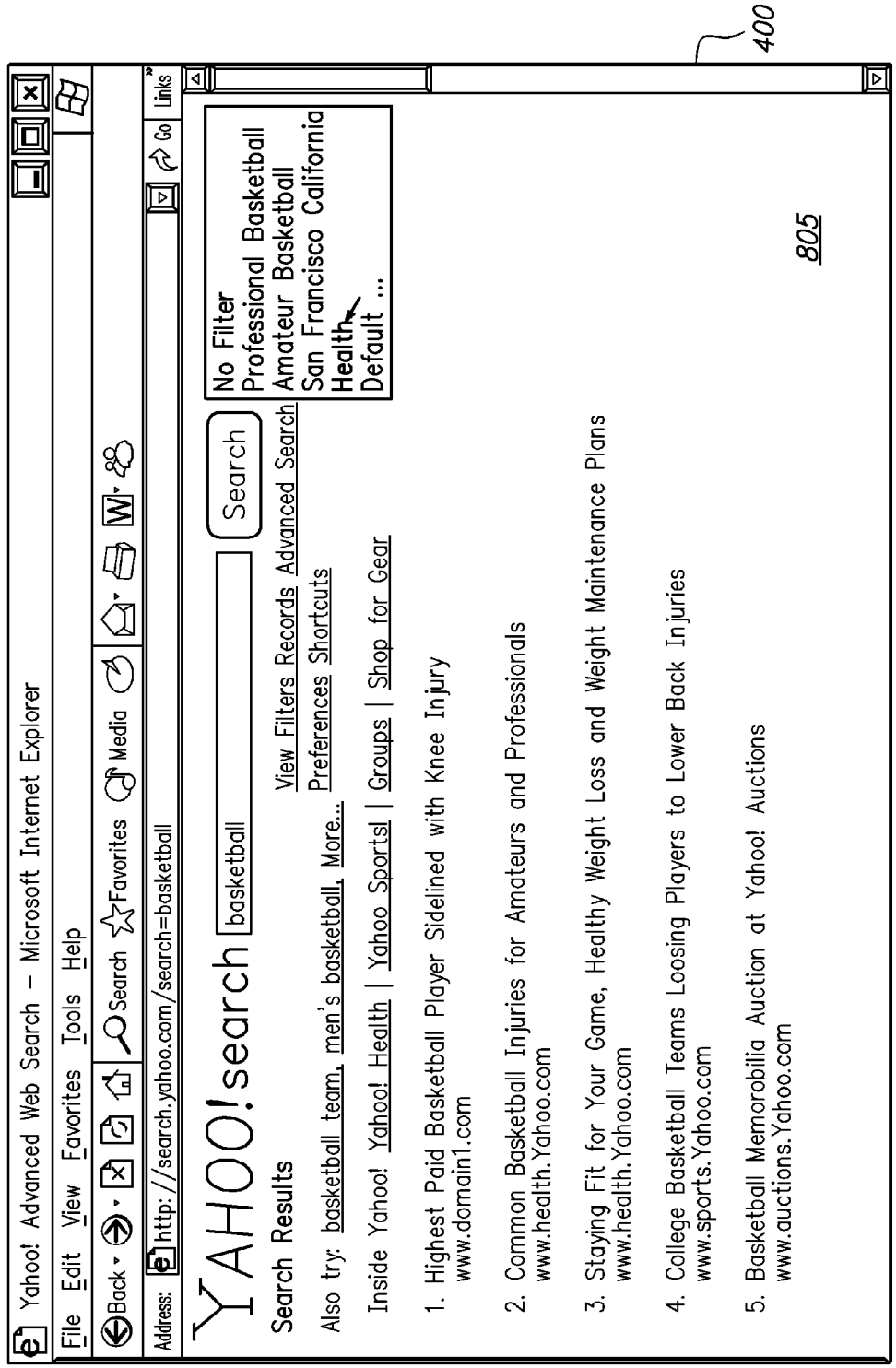
FIG. 8 is an illustration of a browser window that includes a Web page that includes the set of search results filtered by the search filter based on another selected filter record.

FIG. 8 is an illustration for browser window 600 that includes a Web page 805 having a set of filtered-search results for the query string basketball and the heath filter record. As shown in FIG. 8, the abstracts 1-4 for identified documents that include keywords, topics, etc. in the health filter record are ranked in the search result relatively higher than other abstracts (e.g., abstract 5) for identified documents not including the keywords or topics of the health filter record. Also, as seen in a comparison of FIGS. 6 and 8, the basketball memorabilia auction document is ranked relatively lower in FIG. 8 than in FIG. 6, as the abstracts for the identified documents that include the keywords and/or the topics of the health filter record are ranked above this abstract.

According one embodiment, the filter fields of a filter record may be weighted by a set of weighting factors 810 that define the relevancy of the filter fields in a query context. The weighting factors might be numbers (e.g., 0-1) or other descriptors used to weight the relevancy of a set of filter records. In a query context, identified documents and their associated abstracts may be ranked based on the weighting factors. Relatively high ranked abstracts may be prominently presented (e.g., position higher in list of abstracts) in a set a search results. For example, the keyword filter field and the topic filter field may be weighted with respective weighting factors that might indicate that the keyword filter field is of higher relevancy than the topic filter field or vise versa. If a first set of identified documents includes one or more keywords included in the keyword filter field, and a second set of identified documents includes one or more topics from the topic filter field, the first set of identified documents may be ranked relatively higher than the second set of identified documents. Based on this ranking, abstracts for the first set of documents may be presented relatively more prominently in a set of search results than the abstracts associated with the second set of documents. For example, abstracts for the first set of documents may be presented relatively higher on a page of search results than abstracts for the second set of documents.

According an alternative embodiment, the filter elements of the filter fields are weighted by the set of weighting factors 810 that define the relevancy of the filter elements in a query context. Identified documents and their associated abstracts may be ranked based on the filter element weighting and presented in a set of search results according to the ranking. According to one embodiment, both filter fields and the filter elements associated with the filter fields may be assigned weighting factor for ranking a set of documents identified in a query. While ranking has been described above as a method that includes comparing weighting factors to rank a set of identified documents, ranking may be based on a mathematical function of the weighting factors. Mathematical functions that might be used to determine a ranking of identified documents include an addition function, a multiplication function, a logarithmic function, an exponential function or the like.

According to one embodiment, the weighting factors may be used by the search filter to re-rank a set of identified documents that were previously ranked for relevancy by the search engine. Alternatively, the weighting factors might be used by the search engine in conjunction with other ranking methods used by the search engine to rank and/or re-rank a set of identified documents. The weighting factors may be set by the user, the filter editor or the like at the time a filter record is created or subsequently to update the weighting factors to indicate a user's changing interests over time.

Figure 9:
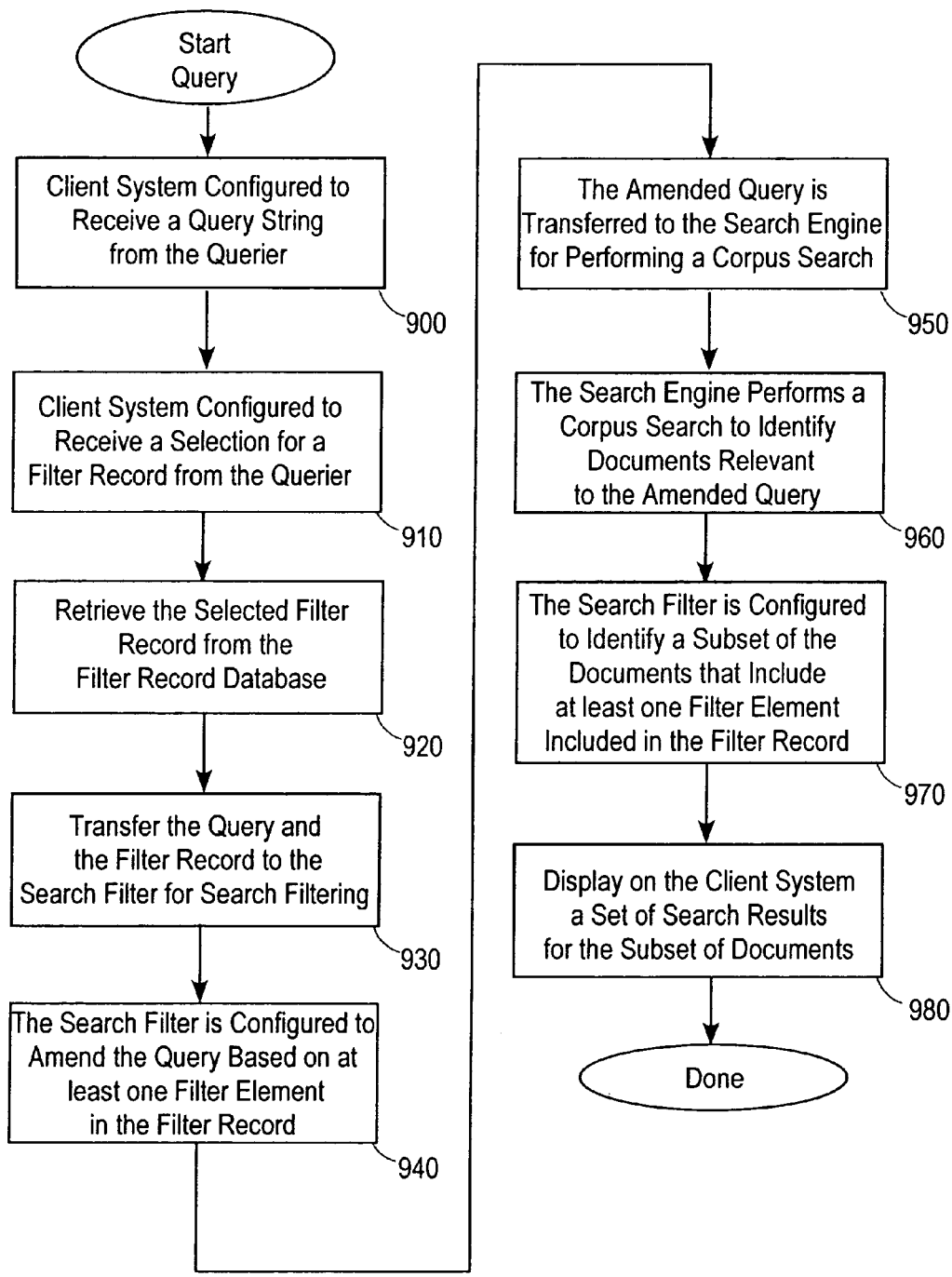
FIG. 9 is a high-level flow chart having steps for searching a document corpus to identify documents relevant to a query amended by a search filter to provide a context-specific set of search results.

FIG. 9 is a high-level flow chart having steps for searching a document corpus to identify documents relevant to an amended query amended by a search filter to provide a context-specific set of search results. That is, the search filter is configured to apply a set of filter elements to the query and to a set of search results (which are relevant to the query) to set a context for the search, wherein the filter elements define the context. The filter elements may be applied by the search filter to a number of queries to set the same context for each query and for the search results relevant to the query. The high-level flow chart is merely exemplary, and those of skill in the art will recognize various steps that might be added, deleted, and/or modified, and are considered to be within the scope and purview of the present invention. Therefore, the exemplary embodiment should not be viewed as limiting the invention as defined by the claims.

At 900, a client system associated with a querier is configured to receive a query string from a querier. A query string for a query might be entered by the querier on a Web page displayed on the querier's client system. Alternatively, a querier that is a computer system might be configured to provide the query string to the client system. It might be in the latter case that although a computer querier provides the query string for a query, a human user might be the ultimate user of a set of search results generated for the query. At 910, the client system is further configured to receive a selection for a filter record from the querier. The filter record selected might be selected from a plurality of filter records that might be presented to the querier on the display of the client system. For example, the plurality of filter record might be displayed in a drop down menu or other menu. Each filter record will include at least one filter element. As mentioned briefly above, the filter elements are used by a search filter to establish a context for the search.

At 920, the selected filter record is retrieved for use by the search filter. More specifically, the search filter may be configured to issue a request to one or more other servers to retrieve the selected filter record from a filter-record database. At 930, the filter record and the query string are transferred to the search filter. At 940, the search filter is configured to add at least one of the filter elements that are included in the selected filter record to the query to generate an amended-query. At 950, the search filter is configured to transfer the amended query to the search engine. At 960, the search engine performs a document-corpus search to identify a set of documents relevant to the amended-query. The document corpus might include the Internet, an intranet or a combination thereof. The document corpus might also include an index of the corpus, and/or a cache that includes cached versions of documents in the corpus.

At 970, the search filter is configured to identifying a subset of the documents identified by the search engine such that these documents include at least one of the filter elements or that is otherwise associated with at least one of the filter elements. At 980, a set of search results for the subset of the documents is displayed on a display of the client system. The search results for the subset of the identified document might include hyperlinks to pages (e.g., HTML pages) that include the documents.

Figure 10:
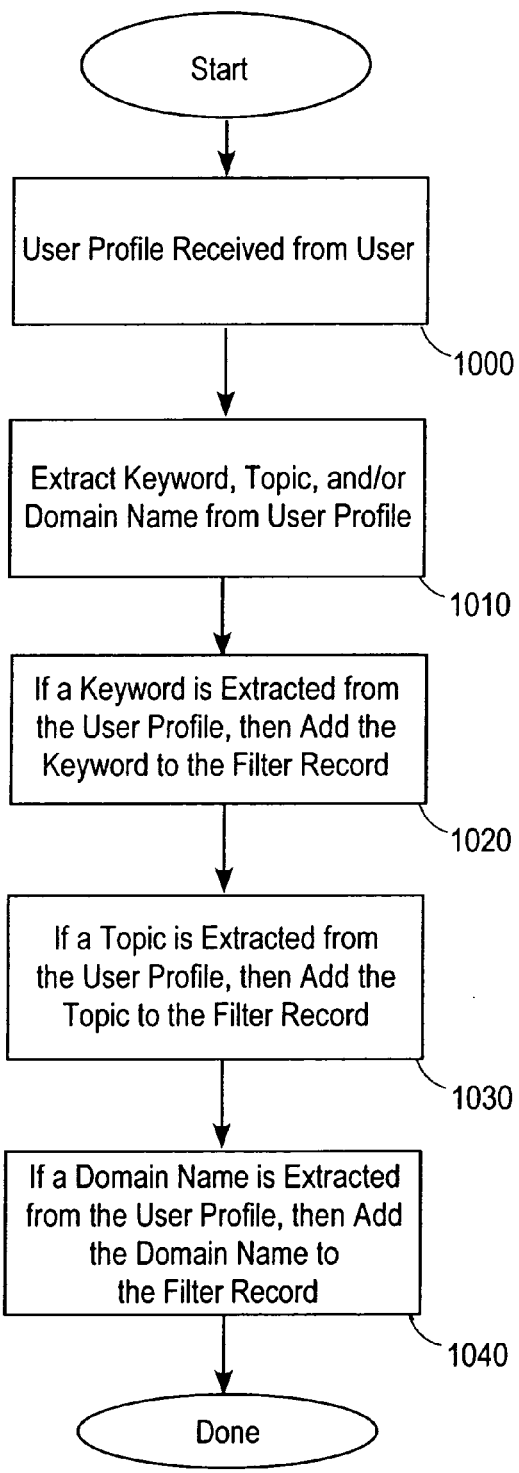
FIG. 10 is a high-level flow chart having steps for generating a filter record according to one embodiment of the present invention.

FIG. 10 is a high-level flow chart having steps for generating a filter record. The filter record is configured for use by a search filter for setting a context for a query of a document corpus. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims.

At 1000, a user profile is received from a user. The user profile may be provided by the user in response to a request for information for a user account, a user service or the like. At 1010, at least one keyword, at least one topic, and/or at least one domain name is extracted from the user profile. At 1020, if a keyword is extracted from the user profile, then the keyword is inserted into a keyword filter field of the filter record. At 1030, if a topic is extracted from the user profile, then the topic is inserted into a topic filter field of the filter record. At 1040, if a domain name is extracted from the user profile, then the domain name is inserted into a domain name filter field of the filter record. The filter record might be stored in a filter-record database for later use. The filter-record database may be accessible by the search filter for search filtering as described above.

It is to be understood that the examples and embodiments described above are for illustrative purposes only and that various modifications or changes in light thereof will be suggested to persons skilled in the art and are to be included within the spirit and purview of this application and scope of the appended claims. For example, filtering methods described herein might be combined with other filtering techniques such as feedback relevancy methods, wherein a user identifies to the search engine, search filter or the like documents that the user determines are of relatively high relevance to a query and the search filter ranks the identified document for the instant query and/or subsequent queries based at least in part on the user identification of relevant documents. Therefore, the above description should not be taken as limiting the scope of the invention as defined by the claims.

What is claimed is:

1. A computerized search method, the method comprising:
   presenting, to a querier, a single interface that includes two mechanisms for specifying search terms for the same query in two different manners;
   wherein the first mechanism includes first controls for receiving a query string from the querier;
   wherein the second mechanism includes second controls for selecting one of a plurality of selectable items;
   wherein each selectable item of the plurality of selectable items corresponds to a filter record of a plurality of filter records;
   wherein said first controls allow the querier to enter one or more search terms that comprise the query string;
   wherein said second controls allow the querier to specify which filter record, of the plurality of filter records, to use to generate an amended query string based on said query string;
   receiving a request from the querier, wherein receiving said request includes receiving a first set of search terms from the querier through said first controls and receiving, through said second controls, a selection of a selectable item;
   based on the request indicating the selection of the selectable item, determining that a selected filter record should be used to process the request, wherein the selected filter record corresponds to the selectable item that was selected through said second controls and includes a set of filter elements that correspond to a second set of search terms;
   adding search terms that correspond to the filter elements associated with the selected filter record to the first set of search terms to generate said amended query string that includes both the first set of search terms and the second set of search terms; and
   performing a document-corpus search of a document-corpus by treating the second set of search terms as if they were a part of said first set of search terms submitted through said first controls, to identify a set of documents relevant to the both the first set of search terms and the second set of search terms;
   wherein performing the document-corpus search involves comparing both the first set of search terms and the second set of search terms to terms contained in documents that belong to the document-corpus;
   wherein the method is performed by one or more computing devices.

2. The method of claim 1, wherein the querier is a human.

3. The method of claim 1, wherein the querier is a computer.

4. The method of claim 1, further comprising:
   generating one or more custom filter records based on information extracted from a user profile of the querier;
   storing, in a filter-record database, the one or more custom filter records;
   selecting, from the filter-record database, at least one custom filter record of the one or more custom filter records to present to the querier based on information associated with the querier;
   wherein at least one of the plurality of selectable items corresponds to the at least one custom filter record.

5. The method of claim 1, wherein the text of at least one filter element associated with the selected filter record is not presented to the querier on the single interface.

6. The method of claim 1, wherein the step of adding search terms that correspond to the filter elements associated with the selected filter record to the first set of search terms to generate said amended query string that includes both the first set of search terms and the second set of search terms is performed by a client computing device that performed the presenting step.

7. A search system comprising:
   a client system including one or more processors configured to present, to a querier, a single interface that includes two mechanisms for specifying search terms for the same query in two different manners;
   wherein the first mechanism includes first controls for receiving a query string from the querier;
   wherein the second mechanism includes second controls for selecting one of a plurality of selectable items;
   wherein each selectable item of the plurality of selectable items corresponds to a filter record of a plurality of filter records;
   wherein said first controls allow the querier to enter one or more search terms that comprise the query string;

wherein the second controls allow the querier to specify which filter record, of the plurality of filter records, to use to generate an amended query string based on said query string, at least one server system configured to receive a request from the querier, wherein the request includes receiving a first set of search terms from the querier through said first controls and receiving, through said second controls, a selection of a selectable item;

the at least one server system configured to determine, based on the request indicating the selection of the selectable item, that a selected filter record should be used to process the request, wherein the selected filter record corresponds to the selectable item that was selected through said second controls and includes a set of filter elements that correspond to a second set of search terms;

a search filter configured to add, to the first set of search terms, search terms that correspond to the filter elements associated with the selected filter record to generate said amended query string that includes both the first set of search terms and the second set of search terms; and a search engine including one or more processors configured to perform a document-corpus search of a document-corpus by treating the second set of search terms as if they were a part of said first set of search terms submitted through said first controls, to identify documents relevant to both the first set of search terms and the second set of search terms;

wherein the search engine is configured to perform the document-corpus search by comparing both the first set of search terms and the second set of search terms to terms contained in documents that belong to the document-corpus.

8. The search system of claim 7, wherein the text of at least one filter element associated with the selected filter record is not presented to the querier on the single interface.

9. The search system of claim 7, wherein the search filter is a module of the client system.

10. The search system of claim 7, wherein the search filter is a module of the search engine.

11. The search system of claim 7, further comprising:
one or more custom filter records generated for the querier based on information extracted from a user profile of the querier, and stored in a filter-record database;
the server system configured to select, from the filter-record database, at least one custom filter record of the one or more custom filter records to present to the querier based on information associated with the querier;
wherein at least one of the plurality of selectable items corresponds to the at least one custom filter record.

12. The search system of claim 7, wherein the querier is a computer.

13. The search system of claim 7, wherein the querier is a human.

14. A volatile or non-volatile computer-readable non-transitory storage medium storing one or more sequences of instructions which, when executed by one or more processors, causes the one or more processors to perform:
presenting, to a querier, a single interface that includes two mechanisms for specifying search terms for the same query in two different manners;
wherein the first mechanism includes first controls for receiving a query string from the querier;
wherein the second mechanism includes second controls for selecting one of a plurality of selectable items;
wherein each selectable item of the plurality of selectable items corresponds to a filter record of a plurality of filter records;
wherein said first controls allow the querier to enter one or more search terms that comprise the query string;
wherein said second controls allow the querier to specify which filter record, of the plurality of filter records, to use to generate an amended query string based on said query string;
receiving a request from the querier, wherein receiving said request includes receiving a first set of search terms from the querier through said first controls and receiving, through said second controls, a selection of a selectable item;
based on the request indicating the selection of the selectable item, determining that a selected filter record should be used to process the request, wherein the selected filter record corresponds to the selectable item that was selected through said second controls and includes a set of filter elements that correspond to a second set of search terms;
adding search terms that correspond to the filter elements associated with the selected filter record to the first set of search terms to generate said amended query string that includes both the first set of search terms and the second set of search terms; and
performing a document-corpus search of a document-corpus by treating the second set of search terms as if they were a part of said first set of search terms submitted through said first controls, to identify a set of documents relevant to the both the first set of search terms and the second set of search terms;
wherein performing the document-corpus search involves comparing both the first set of search terms and the second set of search terms to terms contained in documents that belong to the document-corpus.

15. The volatile or non-volatile computer-readable non-transitory storage medium claim 14, wherein the querier is a human.

16. The volatile or non-volatile computer-readable non-transitory storage medium of claim 14, wherein the querier is a computer.

17. A volatile or non-volatile computer-readable non-transitory storage medium of claim 14, further comprising:
generating one or more custom filter records based on information extracted from a user profile of the querier;
storing, in a filter-record database, the one or more custom filter records;
selecting, from the filter-record database, at least one custom filter record of the one or more custom filter records to present to the querier based on information associated with the querier;
wherein at least one of the plurality of selectable items corresponds to the at least one custom filter record.

18. The volatile or non-volatile computer-readable non-transitory storage medium of claim 14, wherein the text of at least one filter element associated with the selected filter record is not presented to the querier on the single interface.

19. The volatile or non-volatile computer-readable non-transitory storage medium of claim 14, wherein adding search terms that correspond to the filter elements associated with the selected filter record to the first set of search terms to generate said amended query string that includes both the first set of search terms and the second set of search terms is performed by a client computing device that performed the presenting.

* * * * *